United States Patent [19]

Williams

[11] Patent Number: 4,645,407

[45] Date of Patent: Feb. 24, 1987

[54] GRIPPER FOR A PROGRAMMABLE MANIPULATOR

[75] Inventor: Anthony M. Williams, Iver, England

[73] Assignee: EMI Limited, Hayes, England

[21] Appl. No.: 744,947

[22] Filed: Jun. 17, 1985

[30] Foreign Application Priority Data

Jun. 18, 1984 [GB] United Kingdom ................ 8415498

[51] Int. Cl.$^4$ ............................................ B25J 15/04
[52] U.S. Cl. .................................... 414/730; 901/39; 901/31; 901/50
[58] Field of Search ................. 414/730, 753; 901/30, 901/31, 41, 40, 50, 39

[56] References Cited

U.S. PATENT DOCUMENTS

| | | | |
|---|---|---|---|
| 3,848,753 | 11/1974 | Borg et al. | 901/30 X |
| 4,046,263 | 9/1977 | Cwycyshyn et al. | 901/30 X |
| 4,227,853 | 10/1980 | Woodford et al. | 414/738 |
| 4,281,447 | 8/1981 | Miller et al. | 901/30 X |
| 4,372,728 | 2/1983 | Murakami | 414/590 |
| 4,488,241 | 12/1984 | Hutchins et al. | 901/30 X |
| 4,512,709 | 4/1985 | Hennekes et al. | 901/41 X |
| 4,525,918 | 7/1985 | Puritz | 901/50 X |

FOREIGN PATENT DOCUMENTS 2819622 11/1979 Fed. Rep. of Germany .

Primary Examiner—Terrance L. Siemens
Attorney, Agent, or Firm—Fleit, Jacobson, Cohn & Price

[57] ABSTRACT

A gripper system for a programmable manipulator includes a gripper arm (10) and an assembly station for holding a finger element (2) releaseably for mounting on the arm. The finger element (2) is held by latches (21, 22) against a tray (20) of the station which can be displaced with respect to a rack plate (1) of the station. The arm is conditioned to move on a predetermined path with respect to the station so that cooperative parts (3, 11) of the arm and a finger element, held at the station, become inter-engaged. When the finger element and the arm are inter-engaged movement of the arm relative to the station causes the finger element to be released. The gripper comprises an arm and a finger element dedicated to a specific handling task. The arm and the finger element have cooperable parts which are inter-engageable to mount the finger element detachably on the arm.

6 Claims, 3 Drawing Figures

GRIPPER FOR A PROGRAMMABLE MANIPULATOR

The present invention relates to a gripper for a programmable manipulator, and more particularly to such a gripper which enables the handling of a wide variety of differently shaped articles.

If programmable manipulators are to be used for assembly as part of a flexible work station capable of the assembly of a variety of different products, the gripper of the manipulator must be capable of picking up a wide variety of different components. Attempts have been made to construct a "universal" gripper, often based upon the human hand; but they tend to be expensive and often not able to perform handling operations satisfactorily.

The present invention provides a gripper system for a programmable manipulator, the system including a gripper arm and an assembly station arranged to hold a finger element releasably for mounting on the arm, wherein the arm is caused, in use, to move on a prearranged path with respect to the assembly station, the arm and the finger element are provided with cooperable parts which become inter-engaged, to effect mounting of the finger element on the arm, as a result of the arm moving on said path, and the assembly station is arranged to release said hold when the finger element is mounted on the arm.

The assembly station may include a body member, a frame member displaceable with respect to the body member and latching means for holding the finger element releaseably against the frame member, said latching means being arranged to release the hold in response to displacement of the finger occasioned by a movement of the arm when said cooperable parts are inter-engaged.

In accordance with another aspect of the present invention there is provided a gripper for a programmable manipulator comprising an arm and a finger element dedicated to a specific handling task wherein the arm and the finger element are provided with cooperable parts, inter-engageable to mount the finger element detachably on the arm.

The finger elements can be low cost items because they can consist essentially only of a section to effect connection with the gripper mount and a section shaped for the handling operation. Also they can be tailored to suit the precise requirements of the component for handling, thereby ensuring improved handling performance and adequate control during the assembly process.

Preferably the co-operating parts on the gripper mount and on the finger elements are of conical form; also preferably the gripper mount or the finger elements have releasable means to effect locking of the two parts and/or means to prevent relative rotation of the two parts.

In order that the invention may more readily be understood, a description is now given, by way of example only, reference being made to the accompanying drawings, in which.

Figure 1:
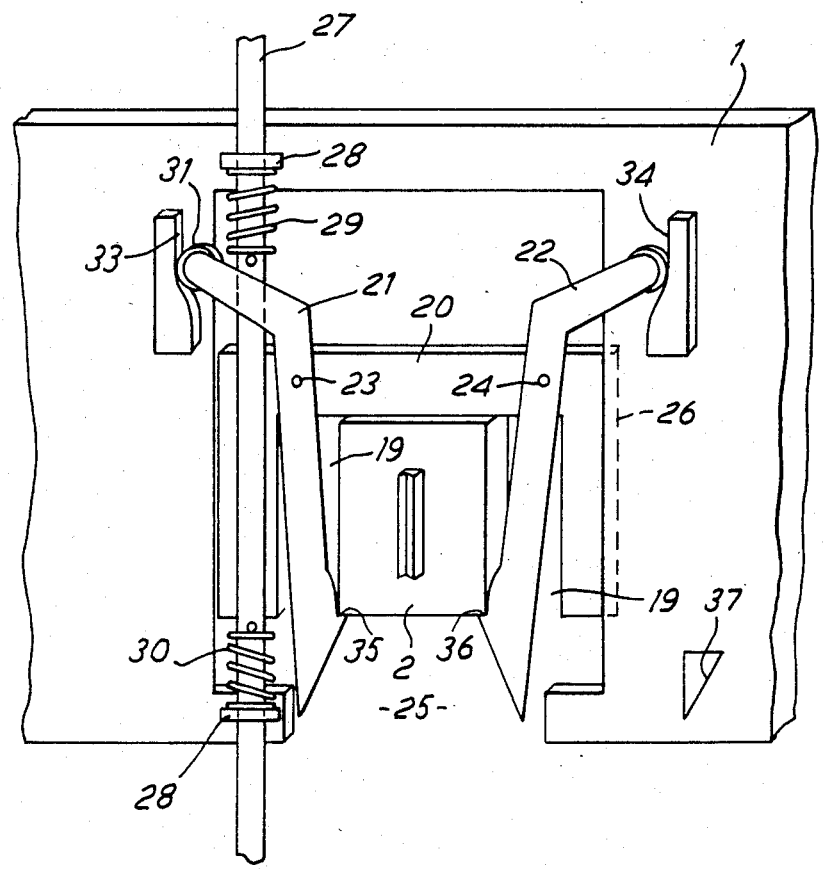
FIG. 1 is a perspective view of part of a rack for assembling the components of a manipulator gripper according to the present invention.

The figures illustrate a manipulator gripper attachment system which has a gripper being capable of holding any one of a number of readily-detachably fingers, each designed for a specific handling operation; the system also incorporates an assembly rack for holding the fingers when not in use and for providing quick and easy assembly and detachment of the gripper and finger.

The assembly rack consists of an elongate horizontal plate 1 having a number of locations (only one being illustrated) at which a finger 2 can be held.

Each finger has a conical section 3 for engagement with a co-operating recess on the gripper, a web 4 extending between the conical section 3 and a flat shield 5, from which there projects a finger element 6 with an end surface 7 whose profile is designed specifically for a particular handling operation. In the illustrated example, the profiled end surface is in the form of an elongate, straight-sided groove; such a finger may be used (together with another gripper and finger of similar, or flat, profile) for holding a length of rod. Clearly there may be a wide range of different profiled fingers available on the rack, thereby permitting a large variety of operations to be performed by the programmable manipulator. Profiled ends for other applications may have any of the following shapes: elongate grooves of different dimensions and/or with arcuate sides; recesses of various cross-sections whether straight-sided (e.g. triangular), arcuate (e.g. circular) or a combination, the recesses being of various depths and having various contours of base surfaces; projections of various shapes and dimensions forming e.g. a probe or a screwdriver head (of standard or "Philips: format).

Figure 2:
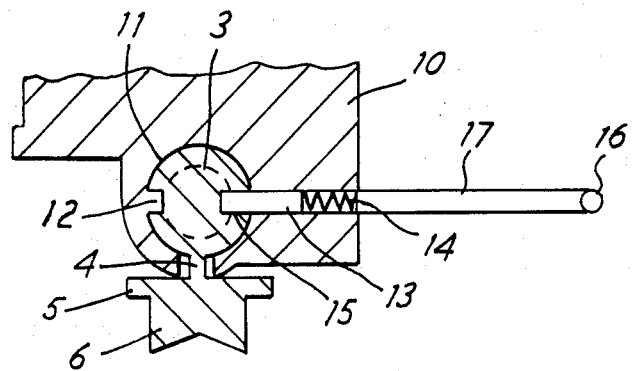
FIG. 2 is a sectional plan view of an assembled gripper according to the present invention.
Figure 3:
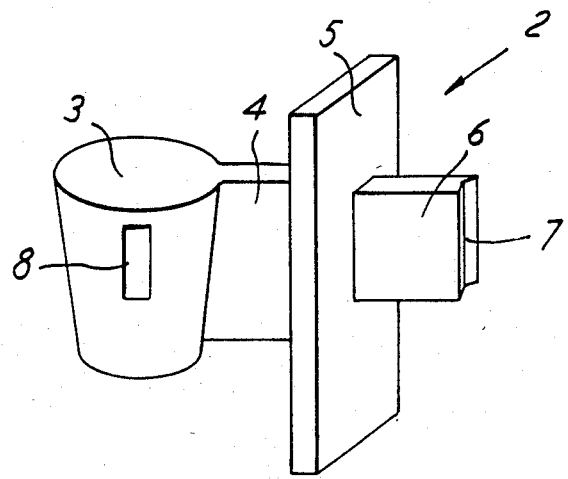
FIG. 3 is a perspective view of the finger in FIG. 2.

FIG. 2 shows the form of engagement in the assembled gripper between finger 2 and a gripper mount 10 which is located on the end of the manipulator arm. A conical recess 11 in gripper mount and of appropriate dimensions receives the conical section 3, which is restrained from rotation therein by lug 12 projecting from gripper mount 10 into part of a recess 8 (see FIG. 3). In order to provide clearance between lug 12 and the finger's conical section 3 during insertion the recess 8 has a length substantially greater than necessary to accommodate the lug 12, its depth decreasing towards the narrow end of conical section 3. In order to retain conical section 3 within recess 11, a pin 13 having spring-loading 14 engages with a recess 15 of comparable dimensions in section 3. The pin 13 has a roller 16 located on an extension 17 such that, when roller 16 is urged away from mount 10, latch pin 13 is moved out of engagement with recess 15 against the action of spring-loading 14, thereby permitting finger section 3 to be withdrawn from recess 11.

In the assembly rack illustrated in FIG. 1, a finger 2 is held in a slot 19 within a tray 20 by means of two latches 21 and 22 each of which is pivotally mounted on tray 20 at hinge-pins 23, 24. The tray 20 is held within a slot 25 of rack plate 1 by means of one of lateral edge of the tray slideably engaging in grooved edge 26 of slot 25, while the opposite edge of the tray is attached to a rod 27 which is mounted against plate 1 via loops 28 in order to be able to move vertically while restrained horizontally. Two sets of springs 29 and 30, located around rod 27, return tray 20 to a predetermined position in slot 25 when external forces are removed. Latches 21 and 22 have a generally L-shape, each with a roller 31, 32 at the free end of the shorter section; each roller is positioned to contact with a cam surface 33, 34.

Prior to the operation of assembling the finger 2 onto the gripper mount 10, the finger 2 is held in the rack in the position shown in FIG. 1. At the start of this operation, the gripper mount 10 approaches, from above and on the side of the rack opposite to that shown in FIG. 1, moving in a downward direction. As the programmable manipulator control system is aware of the exact location of the conical section 3 when finger 2 is held within the rack, it can guide the gripper mount 10 such as to ensure that the recess 11 passes over and around the conical section 3 to enable engagement and then locking of these two parts by means of pin 13. The conical shaping of these two co-operating parts guides them together and encourages their correct alignment, thereby compensating for the minor inaccuracies that might occur in the path taken by the mount 10. The included angle of the conical shaping used for these parts is greater than is necessary for overcoming this misalignment problem in order to effectively eliminate jamming of the parts during their engagement. By suitable choice of the dimensions of the parts, a tolerance on path position of ±2 mm can readily be achieved, this being quite adequate even for existing standard programmable manipulators.

Because conical section 3 is held within the slot 19 of tray 20 merely by latches 21, 22 and by engagement with the upper edge of the slot, section 3 is movable laterally relative to the direction of motion of mount 10. Thus during the insertion of conical section 3 into recess 11, finger 2 is jiggled laterally until correct alignment and engagement is achieved. Forward motion of finger 2 is prevented at this stage by the notches 35, 36 on latches 21, 22.

As soon as the finger 2 is properly picked up and locked, the continuing motion of mount 10 increases the pressing force applied by finger 2 on the latches 21, 22, resulting in the tray 20 and its latches also being urged downwards against the action of spring 30. The downward movement of the tray causes rollers 31, 32 to move along the cam surfaces 33 and 34 which duly make the latches pivot about pivot-pins 23, 24 respectively until their lower ends are separated sufficiently to release finger 2; at this stage, the gripper mount 10, with the finger 2 now locked in position, is free of the rack and ready for the handling operation. The springs 30 return tray 20 to its original position.

The put-down operation for returning the finger 2 to the tray 20 is essentially the reverse of the pick-up operation. As the gripper mount 10, with finger 2 attached, approaches the rack from below in an upward direction, roller 16 engages with another cam surface 37 on rack plate 1 which withdraws pin 13 from recess 15. As the upwardly moving top edge of the finger's shield 5 contacts the inclined ends of latches 21 and 22, the latter are urged laterally apart to allow the finger 2 to pass through, whereupon the latches snap-to behind.

The final separation of the finger 2 and gripper mount 10 is caused when the finger 2 hits the top edge of the slot of tray 20. Any shock loading incurred by this is absorbed by the springs 29, 30.

I claim:

1. A gripper system for a programmable manipulator, the system comprising a gripper arm; at least one article-handling finger element, the arm and the finger element having co-operable, inter-engageable formations whereby the finger element may be mounted detachably on the arm; and an assembly station arranged to hold the finger element releasably, the assembly station including a body member, a frame member displaceable with respect to the body member and latching means for holding the finger element releasably against the frame member;

whereby, in use, in a pick-up mode, movement of the gripper arm in one pre-arranged direction causes the co-operable inter-engageable formations of the gripper arm and of a finger element, held against the frame member, to become inter-engaged therby mounting the finger element detachably on the arm, and thereby causes displacement of the frame member relative to the body member, said latching means being arranged to release the hold thereof on the finger element in response to displacement of the frame member, and, in a put-down mode, movement of the gripper arm in the reverse direction to said one predetermined direction causes a finger element, mounted detachably on the gripper arm, to cooperate with the latching means to be held thereby against the frame member, the co-operable, inter-engageable formations of the finger element and the gripper arm becoming disengaged.

2. A gripper system according to claim 1, wherein said latching means is mounted pivotally on the frame member and is arranged to cooperate with the body member, whereby the latching means is displaceable pivotally with respect to the frame member in response to displacement of the frame member with respect to the body member.

3. A gripper system according to claim 2, wherein the latching means cooperatively engages with a cam surface on the body member.

4. A gripper system according to claim 1, wherein said inter-engageable formations include releasable locking means to inhibit relative movement of the finger element and the arm, the releasable locking means including means engageable with the body member, upon movement of the arm in said reverse direction, to effect release of the locking means.

5. A gripper system according to claim 1, wherein said assembly station includes means to hold a plurality of finger elements, each dedicated to a different handling task, for mounting selectively on the arm.

6. An assembly station for supporting releasably a plurality of article-handling finger elements intended to be mounted selectively on a gripper arm of a programmable manipulator, the assembly station comprising a plate-like body member provided with a plurality of openings along one edge, respective frame members mounted in the openings and being displaceable slidably in the openings with respect to the body member, each frame member comprising two side limbs and an end limb adjacent respective edges of the opening, spring biassing means effective to bias each frame member resiliently towards a rest position, and respective latching members mounted pivotally on each frame member adjacent to the side limbs and being operative to hold a finger element releasably against said end wall, said latching members being co-operable with respective camming surfaces of the body member to be displaced apart from one another in response to a displacement of the frame member from the rest position thereby to release the hold on a finger element and being displaceable towards one another in response to movement of the frame member back to the rest position to be capable of holding a finger element releasably against said end wall.

* * * * *